(12) United States Patent
Lin

(10) Patent No.: US 8,795,434 B2
(45) Date of Patent: Aug. 5, 2014

(54) METHOD AND APPARATUS FOR MASS PRODUCTION OF GRAPHENE AND CARBON TUBES BY DEPOSITION OF CARBON ATOMS, ON FLAT SURFACES AND INSIDE WALLS OF TUBES, GENERATED FROM DISSOCIATION OF A CARBON-CONTAINING GAS STIMULATED BY A TUNABLE HIGH POWER PULSED LASER

(76) Inventor: Jaw Tian Lin, Cerritos, CA (US)

( * ) Notice: Subject to any disclaimer, the term of this patent is extended or adjusted under 35 U.S.C. 154(b) by 686 days.

(21) Appl. No.: 12/807,282

(22) Filed: Sep. 1, 2010

(65) Prior Publication Data

US 2012/0048195 A1 Mar. 1, 2012

(51) Int. Cl.
```
H01L 21/306      (2006.01)
C23C 16/00       (2006.01)
C23C 16/44       (2006.01)
C23C 16/48       (2006.01)
C23F 1/00        (2006.01)
```
(52) U.S. Cl.
USPC .... 118/722; 118/724; 156/345.24; 156/345.5

(58) Field of Classification Search
USPC ........ 118/712, 722, 724; 156/345.13, 345.15, 156/345.24, 345.5; 427/582–584
See application file for complete search history.

(56) References Cited

U.S. PATENT DOCUMENTS

| | | | |
|---|---|---|---|
| 7,622,000 B2* | 11/2009 | Koga et al. | 118/300 |
| 7,939,136 B2* | 5/2011 | Smalley et al. | 427/301 |
| 2007/0292614 A1* | 12/2007 | Liu et al. | 427/249.1 |
| 2009/0137128 A1* | 5/2009 | Ko et al. | 438/710 |
| 2010/0012032 A1* | 1/2010 | Chen | 118/715 |
| 2010/0236479 A1* | 9/2010 | Coulson | 118/723 R |

* cited by examiner

Primary Examiner — Rakesh Dhingra
Assistant Examiner — Benjamin Kendall

(57) ABSTRACT

A method and apparatus for mass production of graphene and carbon tubes is presented. A carbon-containing gas (CCG) inside a set of thin gaps formed by an array of flat plates, or small multiple bores in a cylindrical shell, is maintained under free molecular conditions at all times. A train of intermittent light pulses of a tunable high power laser beam compatible with the CCG's major absorption bands is sent through the CCG inside the gaps, or bores, to cause dissociation of the carbon atoms from the CCG molecules in said molecules' one mean free path of flight and deposition of said atoms onto the adjacent solid surfaces (plate or bore walls) during each pulse, and after a pre-determined number of pulses to form a one-atom-thick layer of hexagonal lattice of carbon atoms. Said carbon atom layers on the flat plate surfaces are graphene, those on the shell bore walls carbon tubes. Large quantity and size, and predicted high quality of products are special features of this method.

10 Claims, 5 Drawing Sheets

SEC. 2-2

SEC. 1-1

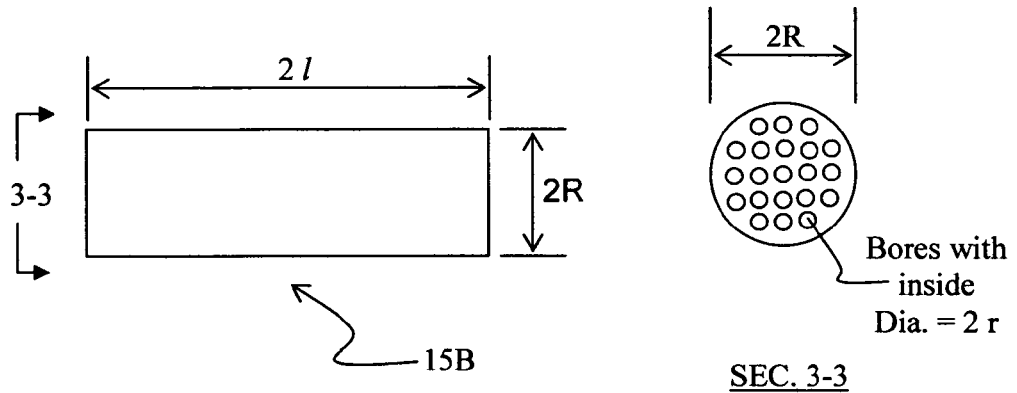
FIG. 6
FIG. 7
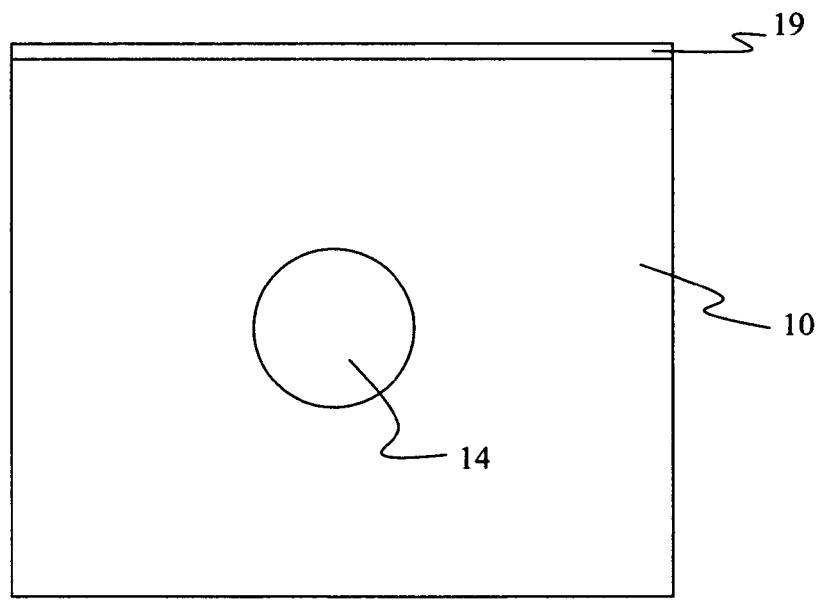
SEC. 4-4
FIG. 8

Analytical Formulas $$f = 2y, \text{ where } y = \begin{cases} b & \text{(flat plate)} \\ r & \text{(cylinder)} \end{cases} \quad (1)$$

$$n = 1/(\sqrt{2}\ \pi\ d^2 f) \quad (2)$$

$$n_c \leq n \quad (3)$$

$$p_c = n_c k T_c \quad (4)$$

$$M = 2zn_c m, \text{ where } z = \begin{cases} abl & \text{(flat plate)} \\ \pi\ r^2 l & \text{(cylinder)} \end{cases} \quad (5)$$

$$E = xc_p M\Delta T, \text{ where } x = \begin{cases} B/b & \text{(flat plate)} \\ (R/r)^2 & \text{(cylinder)} \end{cases} \quad (6)$$

$$v = (8kT_c/(\pi m))^{0.5},\ u = (8kT_h/(\pi m))^{0.5} \quad (7)$$

$$t_p = f/u \quad (8)$$

$$t_i \geq \frac{-(8y+3l)l}{2yv} \ln(1-r_n), \text{ where } r_n \text{ can be any value in } (0.75, 0.99) \quad (9)$$

$$W = E/(\alpha\ t_p) \quad (10)$$

$$n_* \geq 4/(i\ y\ A) \quad (11)$$

$$N_p = c(n_*/n_c)(1/r_n) \quad (12)$$

FIG. 9

Table of Notation

A = surface area of one benzene ring = $5.24 \times 10^{-16}$ cm$^2$ a = the longer dimension of a rectangular flat plate surface (along the laser light path)

$\alpha$ = laser light absorption coefficient of CCG

B = total thickness of flat plate array (gaps + plates)

b = thickness of the gap (clearance) between a pair of flat plates c = a factor roughly in the interval (1.3, 2.0) to account for the fact that some of the free paths of the CCG molecules are less than their mean $c_p$ = CCG specific heat at constant pressure d = diameter of a CCG molecule M = mass of CCG gas per gap or bore in heating region before start of each laser pulse m = mass of a CCG molecule E = amount of energy required to dissociate the total mass of CCG within a hypothetical heating region with a volume equal to the total flat plate array volume (gaps + plates), or to the entire cylindrical shell volume (bores + solid).

f = mean free path of CCG molecules i = number of carbon atoms in a CCG molecule k = Boltzmann constant $l$ = half of flat plate surface shorter side (perpendicular to laser light path), or half of tube length (along laser light path)

Np = total number of light pulses required to complete graphene or carbon tube formation n = number density of CCG molecules $n_c$ = number density of CCG molecules in chamber, also, highest number density of CCG molecules in heating region before each light pulse $n_*$ = required number density of CCG molecules in heating regions before light pulse if production of graphene or carbon tubes could be completed by just one light pulse $p_c$ = chamber CCG pressure R = outside radius of tube shell r = inside radius of one bore in tube shell $r_n$ = fraction of chamber CCG number density diffused into heating regions after each light pulse $T_c$ = chamber room temperature, same as chamber CCG temperature $T_h$ = CCG dissociating molecules' mean temperature associated with their translational mode of motion.

$\Delta T$ = temperature increment from $T_c$ to CCG dissociation temperature $t_p$ = mean time period spent by a CCG molecule in flight of one mean free path $t_i$ = intermission time period between 2 consecutive light pulses $u$ = mean thermal speed, associated with temperature $T_h$, of CCG dissociating molecules $v$ = mean thermal speed of CCG molecules at temperature $T_c$ W = required power of each light pulse

FIG. 10

METHOD AND APPARATUS FOR MASS PRODUCTION OF GRAPHENE AND CARBON TUBES BY DEPOSITION OF CARBON ATOMS, ON FLAT SURFACES AND INSIDE WALLS OF TUBES, GENERATED FROM DISSOCIATION OF A CARBON-CONTAINING GAS STIMULATED BY A TUNABLE HIGH POWER PULSED LASER

BACKGROUND OF THE INVENTION

1. Field of the Invention

This invention relates to the areas of graphene, carbon nanotubes (CNTs), and high-conducting wires.

2. Prior Art

Graphene is a plane atomic monolayer of carbon crystal hexagonal lattice with one atom at each apex of the hexagon, and with the bond length between two neighboring atoms equal to 1.42 angstroms (see FIG. 1). Each hexagon is sometimes called a benzene ring. This atomic monolayer of carbon crystal is the basic building block of graphite which can be considered as formed by stacking up numerous layers of graphene with much weaker bonds in the direction normal to the parallel planes of the layers. Graphene is also the basic form of all graphite related molecular forms: the microscopic soccer ball-like buckyballs, other spheroid-shape molecules, and carbon nanotubes (CNTs). All these are categorized as fullerences. While all spheroid type molecules can be thought of as graphene wrapped in closed forms, carbon nanotubes (single-walled nanotubes (SWNTs) and multi-walled nanotubes (MWNTs)) are microscopic single-layer and multi-layer graphene rolls with open ends and with their circumferences just a few benzene rings across.

The existence of graphene was discovered in 2004 (Ref. 1) and the stability of this material was confirmed in 2007 (Ref. 2). Since its discovery, graphene, due to its peculiar physical properties, has become the hottest chased-after material in the scientific community around the world (Ref. 3). On the other hand, the discovery of CNTs can be traced back to over half a century when L. V. Radushkevich et al. reported finding on these materials in the Soviet Journal of Physical Chemistry in 1952. Carbon nanotubes have been produced and reported since then. But it was not until the 1990's that the importance of CNTs began to catch people's attention.

Researches on graphene, CNTs, etc. have shown enormous potential applications of these materials (due to their high electron mobility and mechanical strength, extreme hardness, flexibility, etc.) in the electronic, electrical, mechanical, medical, environmental, composite materials, and energy production, transport, and storage industries, besides their fundamental research values (Refs. 3, 4, 5, 6). However, the limited production capacity of these materials, both in quantity and unit (molecule) size, have so far prevented realization of these potentials to reach industry levels. Current graphene and CNT production methods are described as follows.

On graphene production, a few known methods are (Refs. 3, 4, 7): mechanical exfoliation, works by searching for microscopically small pieces of graphene from graphite abrasion debris under an optical microscope; Ultrasonic exfoliation, by drying out sheets of graphene powder, generated from ultrasound break-up graphite target, spreading on water surface; chemical exfoliation, by drying out graphite dissolving organic solutions (can have graphene sizes up to few tens of square microns); chemical vapor deposition (CVD), by flowing a hydrocarbon gas over a heated surface, causing carbon atoms decomposed from the gas to form graphene on downstream cooler surfaces (can have graphene sample sizes up to a few square centimeters). All these methods are having quality problems.

Owing to a much longer period of development, CNT manufacturing technologies are more productive than those of graphene's, and the currently available methods include: CVD method (Ref. 8), works by flowing a carbon-containing gas over a heated surface with a distribution of metal nanoparticles to act as a catalyst to produce CNTs (both SWNTs and MWNTs); arc discharge (Ref. 9), both SWNTs and MWNTs are produced on graphite electrodes in an arc discharge; laser ablation (Ref. 10), by laser ablation of a graphite target in a high temperature reactor. As in the cases of graphene manufacturing, all these methods have quality problems.

BRIEF SUMMARY OF THE INVENTION

This invention creates a method for mass production of graphene and carbon tubes (CTs) of all sizes, with high quality, for these products' application potentials to be materialized.

Two windows facing each other are built-in on two opposite side walls of a chamber. An array of parallel flat plates with small gaps between each pair of neighboring plates, or a cylindrical shell with multiple bores, is installed inside the chamber. A carbon-containing gas (CCG) is introduced into the chamber and maintained at a moderately low pressure there. The gap thickness of the plate array, or the bore size of the shell, is chosen such that the CCG inside them are maintained under free molecular conditions at all times. The plate array, or the cylindrical shell, is positioned and oriented such that the windows and the plate gaps, or cylindrical bores, form a see-through view of sight. A train of a pre-determined number of pulses of a tunable high power pulsed laser compatible with the CCG's major absorption bands is sent through the CCG inside the gaps, or bores, to cause dissociation of the carbon atoms from the CCG gas molecules in one mean free path of flight and deposition of said atoms onto the adjacent flat plate surfaces, or the walls of the bores in the cylindrical shell, during each pulse, and to from a complete one-atom-thick layer of hexagonal lattice of carbon atoms on the flat surfaces, or on the walls of the shell bores, after completion of the train of pulses. Said carbon atom layers on the plate surfaces are called graphene, those on the shell bore walls CTs.

BRIEF DESCRIPTION OF THE SEVERAL VIEWS OF THE DRAWINGS

FIG. 6 is a schematic of the symbolic 15 shown in FIG. 2 when it represents a cylindrical shell with multiple bores 15B.

FIG. 7 is a schematic of the cross-sectional view 3-3 of the cylindrical shell shown in FIG. 6. For simplicity, only a few bores are shown, while the shell can have any convenient number of bores.

FIG. 8 is a schematic of the cross-sectional view 4-4 shown in FIG. 2 when the chamber removable cover 19 is on (thermal mass 12 outside the chamber is not shown).

FIG. 9 is a list of analytical formulas. FIG. 10 is a table of notation.

DETAILED DESCRIPTION OF THE INVENTION

Figure 1:
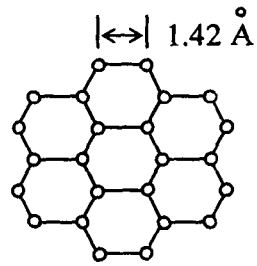
FIG. 1 is a schematic representation of a tiny piece of a graphene sheet.

This invention is constructed by utilizing several areas of study toward a common goal: to obtain a method for mass production of graphene and carbon tubes (CTs). The kinetic theory of gases and rarefied gas dynamics are two areas among them. With rarefied gas dynamics, it suffices to mention a bit on its basics as follows.

In a gas flow problem, ideally, when the number of gas inter-particle collisions is negligibly small compared to that of gas particle-solid surface collisions, or equivalently, when the mean free path, the average length between two consecutive inter-particle collisions, is very large compared to a characteristic length of the solid structure involved, the gas flow is said to be under free molecular conditions, or the flow is free molecular. In practice, however, when the mean free path of the gas flow is larger than or about the same size as said structure length for internal flows, or said path is several times of said length for external flows, the flow is considered nearly free molecular or just free molecular.

The concept of this invention is to create regions (within a chamber), partially confined by surfaces of a solid substrate, for a carbon-containing gas (CCG, such as methane, carbon dioxide, ethanol, ethylene, etc.) to be in free molecular conditions inside the regions, for a train of a pre-determined number of pulses of a tunable high power laser (such as helium-neon, xenon-fluoride, carbon-dioxide, hydrogen-chloride lasers, excimer lasers, etc.), compatible with the major absorption bands of the chosen CCG, to go through the regions to cause dissociation of most of the carbon atoms from the CCG molecules during one mean free path of flight of said molecules and deposition of said atoms to the adjacent surfaces of said substrate during each light pulse, and for diffusion mechanism to replenish with fresh CCG to, and empty other dissociated gas products from, the regions during each intermission between two consecutive pulses, thus avoiding inter-molecule collisions and molecule-solid surface collisions of the under-energized molecules to continuously raise said substrate materials' temperatures, and achieving the goal of having a complete one-atom-thick layer of hexagonal lattice of carbon atoms to grow on the substrate surfaces without causing substrate materials to reach their damaging temperatures.

This concept is applicable to regions of any geometries. At the present time, two kinds of geometrical configurations are chosen as the preferred embodiments. They are regions partially confined by surfaces of an array of parallel flat plates, and those by the surfaces of small multiple bores inside a cylindrical shell. The former is for the carbon atoms dissociated from the CCG molecules to form graphene on the flat surfaces of the plate array, and the latter is for said atoms to form CTs on the bore walls inside the cylindrical shell. At this point, mention must be made that the term carbon tube here means a single layer of graphene attached to the cylindrical inside surfaces of a hollow tube of any diameter sizes, ranging from nanometer all the way up to macroscopic sizes, say, millimeter or larger in magnitudes. Thus, success of this method inevitably will expand carbon tube applications to include electrical areas (e.g., electric wires of much less resistance), in addition to the electronic world dominated so far by carbon tubes of nanometer scales; i.e., carbon nanotubes (CNTs).

It is essential to make a few statements on the substrate (flat plate or cylindrical shell) materials here. A wide variety of dielectrics such as glass, ceramics, plastics, polymers, etc. can be used as substrate materials for graphene and CTs in their manufacturing and applications. A special selection depends on the selections of the CCG (its properties), tunable laser light (its emission bands), the candidate substrate's own properties, and the purpose of application. However, if cost is not a concern, bandgap-design photonic-crystal fibers (Refs. 11, 12) are preferred in order to minimize power loss along the laser light path and substrate temperature increase. And in the cases of CNT production, photonic crystals, or materials highly transparent to the laser light, must be used to thermally combat the high power loads on the substrate in order to maximize the number of tubes (bores) per shell. Furthermore, a coating of reflective film on the substrate frontal cross-sectional surface facing the incoming laser beam is necessary for all cases (graphene or CT production) to minimize the thermal shock effect (Ref. 13) on the substrates at its front end. And finally as a remark, fibers with bore sizes in nano-scales do not seem available at the present time, which affects realization of production of CNTs with this method. To solve this problem, I propose a possible approach of laser drilling which should work well since CNTs are short in lengths. It should be noted, however, that for this purpose, the laser light emission bands must be absorbing to the fiber materials. Thus, the emission bands of the drilling laser light are used with opposite purpose from those of the laser used for dissociating the CCG.

The foregoing descriptions thus constitute a complete presentation of the concept for mass production of graphene and CTs, together with a few related items, while the method to carry out this concept to its realization is described in the following. The method consists of three parts, namely, the production equipment setup, analysis, and operation procedure.

Production Equipment Setup

Figure 2:
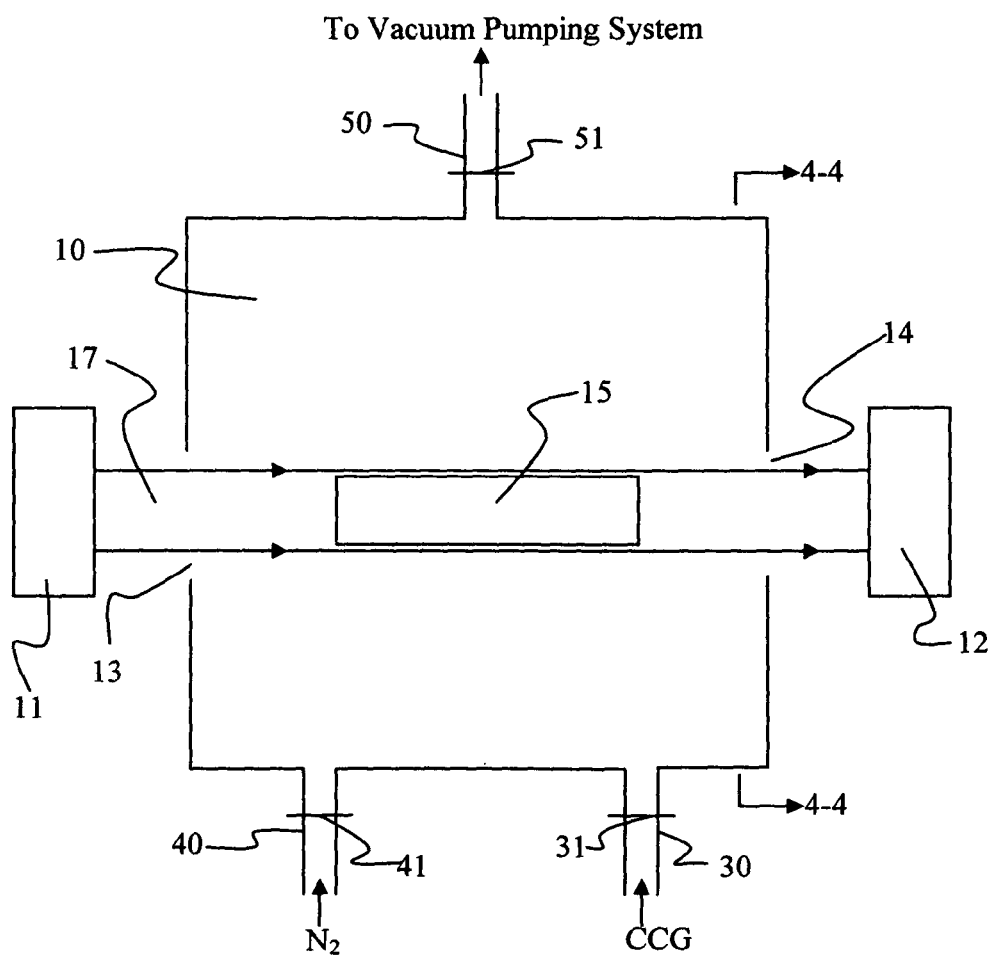
FIG. 2 is a schematic, top view (plan view) of the production equipment setup used in carrying out this invention (chamber removable cover is not on).
Figure 3:
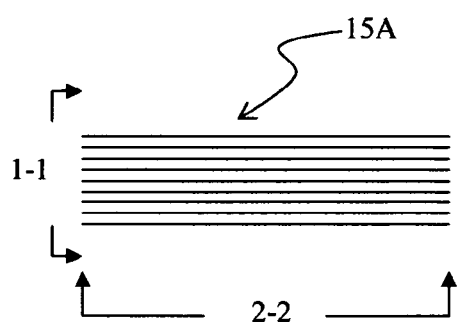
FIG. 3 is a schematic of the symbolic 15 shown in FIG. 2 when it represents a flat plate array 15A. For simplicity, only a few plates are shown, while the array can have any convenient number of plates.
Figure 5:
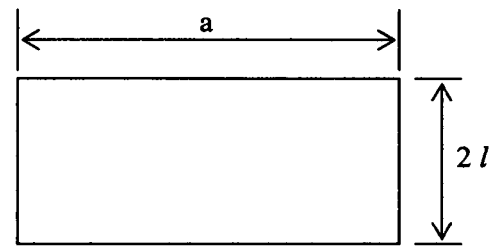
FIG. 5 is a schematic of the cross-sectional view 2-2 of the flat plate array shown in FIG. 3.
Figure 4:
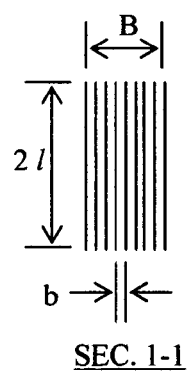
FIG. 4 is a schematic of the cross-sectional view 1-1 of the flat plate array shown in FIG. 3.

The equipment setup for production of graphene and carbon tubes may be described by reference to FIGS. 2 to 8. First referring to FIG. 2, a working chamber (the chamber) 10 made of a low gas absorbing material like stainless steel, is connected to a gaseous nitrogen feedline 40 with valve 41 to let in $N_2$ from its source for pre-production system purging, a CCG feedline 30 with valve 31 to let in the CCG from its source, and to an evacuation line 50 with valve 51 for pumping. Two built-in windows 13 and 14 are located on two opposite walls of the chamber. A removable cover 19 (see FIG. 8) is provided for installation and removal of equipment inside the chamber. FIG. 2 is a top view (plan view) of the equipment setup with the cover removed. A laser source 11 of a tunable high power pulsed laser compatible with the CCG's major absorption bands is placed in front of window 13 outside the chamber. Both 13 and 14 are transparent to the laser light, and are shown as openings in FIG. 2 to emphasize this point. A substrate structure 15 for graphene, or carbon tubes, is installed inside the chamber with support structure. Item 15 shown in FIG. 2 is a symbolic representation for either one of the following two things: graphene substrate schematic diagram, shown in FIG. 3 as 15A (together with cross-sectional views in FIGS. 4 and 5), of an array of alternating parallel rectangular flat plates and gaps, and carbon tube substrate schematic diagram, shown in FIG. 6 as 15B (together with cross-sectional view in FIG. 7), of a cylindrical shell with multiple bores. The number of plates in FIG. 3 or that of bores in FIG. 7 can be any convenient number. Substrate 15 is so positioned and oriented inside the chamber that the windows and the flat plate array gaps, or cylindrical shell bores, which are filled with CCG diffused from the chamber and under free molecular conditions inside them (the heating regions), form a see-through view of sight so that pulses of the laser beam 17 from its source can pass window 13, through the heating regions to dissociate the CCG for the break-away carbon atoms to deposit onto the substrate surfaces to form graphene or carbon tubes, through window 14 and out of the chamber. A thermal mass 12 is located outside the chamber and behind window 14 to receive the remaining laser power. Chamber 10 is also equipped with two pressure gauges, one to measure atmospheric to moderately low, say $10^{-3}$ atm., pressure levels and the other one to measure pressures from moderately low to high vacuum, a few heating pads and temperature sensors. The substrate support structures, pressure gauges, heating pads, and the temperature sensors are not shown in the drawings for the purpose of simplicity and clarity. The free volume of the chamber is much larger than the total volume of the flat plate array, or the cylindrical shell, and its support structures so that the CCG density in the chamber does not have appreciable fluctuations caused by gas diffusion in and out of the heating regions.

Analysis

As mentioned earlier, we need to have regions within which the CCG is under free molecular conditions. Thus, after a well balanced decision on the selections of the CCG, type of laser and substrate materials is made, we choose a low enough CCG pressure in the chamber. Then, we size the gaps of the flat plate array, or the bores of the cylindrical shell, which is installed inside the chamber, so the CCG inside the regions (the gaps or bores) is under said conditions with particle-solid surface collisions dominating over inter-particle collisions. The purpose is to use one laser light pulse to dissociate most of the CCG molecules in the regions during one mean free path of flight and have the break-away carbon atoms to deposit on the flat plate, or shell bore, surfaces when they strike the latter without suffering from inter-particle collisions beforehand. In the mean time, the other dissociated gas particles will cool down quickly to the substrate temperature by striking the surfaces without a significant number of inter-particle collisions. In other words, the purpose is to confine the energy exchange to occur to almost only between the CCG dissociated particles (solid carbon atoms and other dissociated gas particles) and the substrate surfaces. After the first laser pulse, we wait for a pre-determined period for the dissociated gas particles to diffuse out to, and the fresh CCG into the regions from, the chamber. Then, another light pulse is sent through the regions, and so on, until a pre-determined number of pulses are done, we have a complete single layer of graphene on each flat plate surface, or on the walls of each bore (inside the cylindrical shell). The latter is called a carbon tube.

To further clarify the concept, consider the CCG in a region to be in the continuum conditions (wherein, the number of inter-particle collisions is dominating over that of particle-solid surface collisions, i.e., opposite to the free molecular flow case) instead. Then, because the mean free path of the CCG is so extremely short, the laser power is unlikely to be able to dissociate the CCG in the region with one pulse. So, after the laser beam sends a pulse to energize the CCG, the under-energized (undissociated) gas particles near a substrate surface get cooled down by the surface after colliding with it will go on to cool down the inner gas particles by colliding with them. This will prevent the gas from reaching its dissociation temperature for a while. Thus, the surface gets warming up together with the gas pulse after pulse of the laser beam, until the substrate temperature reaches its melting point if the CCG's dissociation temperature is higher than that point. It is clear that if the CCG in the region is under free molecular conditions during the entire process, the substrate material's over heating situation will never happen because most of the CCG molecules can be dissociated by each pulse of a reasonably high power laser, and because the total amount of energy released by the train of light pulses in the entire process is insignificantly small compared to the substrate material heat capacities except for those of the CNTs'. In the cases of CNTs, bandgap-design photonic-crystal fiber substrates, or materials transparent to the high power lasers, can be used to avoid the over heating problem.

As in any production or experiment program, a number of pertinent parameters must be set in order to run the program. Here, we use Eqs. (1) to (12) of FIG. 9 to obtain the necessary parameters. In FIG. 9, after b or r is selected, Eq. (1) prescribes the minimum CCG mean free path value required for free molecular flow to prevail in the regions inside the flat plate array or the bores of the cylindrical shell. Eqs. (2) (rough hard sphere model), (4) and (7) are well known results of the kinetic theory of gasses. Eq. (9) gives $t_i$, the time period required for the CCG density in the heating regions to reach an $r_n$ fraction of the chamber CCG density by diffusion after each light pulse. Meanwhile, this time period also approximately equals to the duration for each kind of other dissociated gas particles to diffuse an $r_n$ fraction of its density out of the heating regions into the chamber after each light pulse. Thus, it is set to be the lower bound of the intermission period between 2 consecutive light pulses provided the $r_n$ value is set close enough to 1. Strickly speaking, $r_n$ is the ratio of the heating regions' minimum CCG density after a light pulse to the chamber's constant CCG density $n_c$. Notice that $r_n$ is a function of time, its value varies from 0 to 1 asymptotically, with $r_n=0$ right after the pulse to $r_n=1$ for an unbounded period after the pulse. Thus, to wait for the heating regions' CCG minimum density level to reach exactly the $n_c$ value after a pulse would take forever mathematically. However, $\ln(1-r_n) = -5$ when $r_n=0.9933$. Usually, $r_n=(0.75, 0.99)$ is considered an acceptable range to calculate the $t_i$ values for practical applications. Eq. (9) is derived from the rarefied gas dynamics theory. The rest of the equations in FIG. 9 are either familiar physical relations or that which can be derived easily from them.

It should be noted that in Eq. (7), the dissociating CCG mean temperature $T_h$ is only the part of the gas mean temperature associated with the translational degrees of freedom of motion of the CCG molecules. It is higher than the chamber CCG temperature $T_c$, but much lower than the CCG dissociation temperature which is contributed mostly by the CCG molecules' internal degrees of freedom of motion. In this invention, a gas molecule's energy varies along its free path by absorption of photons during a light pulse. Thus, $T_h$, the molecules' mean temperature associated with their translational energy is difficult to calculate, owing to quite a number of uncertainties, e.g., the frequency and locations of the molecules' encounters with the laser light photons, the infrequent inter-particle collisions, etc. Fortunately, u is a weak function of $T_h$ (u varies with the square root of $T_h$), thus a high accurate value of $T_h$ is not required. Meanwhile, a reasonable approximation of $T_h$ is easy to make, since its value must lie between $T_c$ and the upper temperature range associated with the CCG's translational energy in the dissociation process.

Notice that after a decision on the selections of the CCG, laser and the desired product is made, all the operation parameters can be computed with Eqs. (1) to (12) of FIG. 9. One first decides on the size and quantity of the product, adjusts the values of b and B, or r and R accordingly, set the chamber temperature $T_c$ equal to the room temperature or a few degrees C. above the CCG condensation point, whichever is higher, and the rest of the parameters and other result predictions can be calculated sequentially using these formulas with the CCG properties. In particular, the parameters needed to run the production operation, in addition to $T_c$, are $p_c$, $t_p$, $t_i$, W and $N_p$.

It should also be noted that the CCG absorption coefficient α values are low, even with a tunable laser, due to the low gas pressures encountered in this kind of applications. Moreover, gas a data in pressure ranges considerably lower than atmospheric are usually unavailable. Therefore, a set of tentative α values need to be used in Eq. (10), and we use the W values so obtained to run a number of pre-production tests to determine a for any chosen CCG and laser set for final production.

As a footnote, the selection of the substrate materials is decided mainly on a particular application purpose. However, the possibility of unwanted chemical reactions of said materials with the CCG, and that of appreciable laser energy absorption must be avoided. Once these considerations are covered, said materials no longer affect the analytical calculations, production operation or results.

Operation Procedure

The operation procedure goes by the following sequence of events. With the flat plate array, or the cylindrical shell, well installed inside the chamber, and after complete closing of valves 31 and 41, the vacuum pumping system is switched on for evacuation with the chamber maintained at $T_c$ which is the room temperature or a few degrees C. above the CCG condensation temperature, whichever is higher. Evacuation continues until the chamber pressure reaches a high vacuum at, say, $10^{-9}$ torr (1 atmosphere=760 torr). Value 41 is opened to start hot nitrogen purge (with $N_2$ at, say, 200 degrees C. and moderately low pressure) for, say, 1 hour. Then, value 41 is completely closed. Evacuation at $T_c$, or a simultaneous hot bake and evacuation (if required), begins. The purpose is to drive out (desorb) gases adsorbed and absorbed by the substrates, their support structures, the windows and the chamber walls. When the pressure reaches a high vacuum at, say, $10^{-9}$ ton and stabilizes,the desorption process is completed, valve 51 is closed, and chamber temperature is maintained at $T_c$, or lowered back to $T_c$ (if hot bake required), and kept around this $T_c$ value for the rest of the operation. At this point, valve 31 is slightly opened to let in the CCG which is maintained at temperature $T_c$ from its source. A stabilized chamber pressure $p_c$ can be maintained within tolerable limits by controlling valves 31 and 51, and the speed of the pumping system. Meanwhile, a train of laser pulses, with power W and pulsing duration $t_p$ for each pulse and intermission period $t_i$ between each two consecutive pulses, is sent through window 13, the gaps, or bores, of the substrate assembly, and through window 14, with the remaining photon energy to be absorbed by the thermal mass, until a total of $N_p$ pulses are completed. Valve 31 is closed, the pumping system switched off, chamber pressurized to atmospheric by slowly opening valve 41, valve 41 then closed, chamber cover opened, the product, i.e. the flat plates or the cylindrical shell, taken out, and a production run is ended.

Automatic replacement of substrate assembly (flat plate array or cylindrical shell) inside the chamber for multiple runs without frequent opening of the chamber cover is the goal for actual production operations.

References

1. K.S. Novoselov et al., "Electric Field Effect in Atomically Thin Carbon Films," Science 306, 666 (2004).
2. J.C. Meyer et al., "The Structure of Suspeneded Graphene Sheets," Nature 446, March 2007.
3. A.K. Geim et al., "Carbon Wonderland," Scientific American, April 2008.
4. M. Heger, "Life after Silicon," Discover, June 2009.
5. A. Zettl et al., "Nanotube Radio," Nano Letters, vol. 7, No. 11, 2007.
6. Ed Regis, "The World's Smallest Radio," Scientific American, March 2009.
7. S. Ashley, "Grinding out of Graphene," Scientific American, March 2009.
8. Z.F. Ren, "Synthesis of Large Arrays of Well-Aligned Carbon Nanotubes on Glass," Science 282, 1998.
9. P.G. Collins, et al., "Engineering Carbon Nanotubes and Nanotube Circuits Using Electrical Breakdown," Science 292, 2001.
10. T. Guo, "Self-Assembly of Tubular Fullerences," J. phy. Chem. 99, 1995.
11. J. D. Joannopoulos et al., Photonic Crystals: Molding the Flow of Light, $2^{nd}$ Edition, Princeton Univ. Press, 2008.
12. B. Temelkuran et al., "Wavelength-Scalable Hollow Optical Fibers with Large Photonic Bandgaps for $CO_2$ Laser Transmission," Latters to Nature, 420, December 2002.
13. J. T. Lin, "Thermal Shock Absorption Capacity Evaluation of High Speed Randome Materials," AIAA paper, 93-1124, February 1993.

I claim:

1. An apparatus for mass production of graphene, the apparatus comprising:
    a chamber comprising first and second built-in windows, wherein each window is located on an opposite sidewall of said chamber;
    a carbon containing gas source configured to deliver a carbon containing gas to said chamber through a carbon containing gas feedline and valve;
    a tunable high powered laser configured to deliver intermittent pulses of a laser beam at an absorption band compatible with the major absorption bands of the carbon containing gas;
    a solid substrate with an array of alternating parallel rectangular flat plates and a plurality of gaps positioned inside said chamber, wherein said windows, said tunable high powered laser, and said gaps are linearly aligned such that a laser beam pulse passes through said first window, through said gaps, and out of said chamber through said second window;
    wherein the size of each gap is selected such that each pulse of said laser beam dissociates carbon atoms from the carbon containing gas in free molecular conditions in said gaps to cause deposition of carbon atoms to the adjacent surfaces confining the plurality of gaps of said substrate to form graphene, and wherein the substrate materials have absorption bands different than the absorption band of the tunable high powered laser to allow full contact of laser and substrate without the possibility of the substrate overheating.

2. The apparatus of claim 1, further comprising:
a nitrogen gas source configured to deliver a nitrogen gas to said chamber through a nitrogen gas feedline and valve for pre-production purging;
a pumping system comprising an evacuation line and valve for exhausting said chamber.

3. The apparatus of claim 1, further comprising:
a thermal mass outside the second window for absorbing the remaining power of the outgoing laser beam.

4. The apparatus of claim 1, wherein the carbon containing gas is selected from one of methane, carbon dioxide, ethanol, and ethylene.

5. The apparatus of claim 1, wherein the tunable high powered laser is selected from one of a helium-neon laser, xenon-fluoride laser, carbon-dioxide laser, hydrogen-chloride laser, and an excimer laser.

6. An apparatus for mass production of carbon tubes, the apparatus comprising:
a chamber comprising first and second built-in windows, wherein each window is located on an opposite sidewall of said chamber;
a carbon containing gas source configured to deliver a carbon containing gas to said chamber through a carbon containing gas feedline and valve;
a tunable high powered laser configured to deliver intermittent pulses of a laser beam at an absorption band compatible with the major absorption bands of the carbon containing gas;
a solid substrate with multiple bores inside a cylindrical shell positioned inside said chamber, wherein said windows, said tunable high powered laser, and said bores are linearly aligned such that a laser beam pulse passes through said first window, through said bores, and out of said chamber through said second window;
wherein the size of each bore is selected such that each pulse of said laser beam dissociates carbon atoms from the carbon containing gas in free molecular conditions in said bores to cause deposition of carbon atoms to the adjacent surfaces confining the bores of said substrate to form carbon tubes, and wherein the substrate materials have absorption bands different than the absorption band of the tunable high powered laser to allow full contact of laser and substrate without the possibility of the substrate overheating.

7. The apparatus of claim 6, further comprising:
a nitrogen gas source configured to deliver a nitrogen gas to said chamber through a nitrogen gas feedline and valve for pre-production purging;
a pumping system comprising an evacuation line and valve for exhausting said chamber.

8. The apparatus of claim 6, further comprising:
a thermal mass outside the second window for absorbing the remaining power of the outgoing laser beam.

9. The apparatus of claim 6, wherein the carbon containing gas is selected from one of methane, carbon dioxide, ethanol, and ethylene.

10. The apparatus of claim 6, wherein the tunable high powered laser is selected from one of a helium-neon laser, xenon-fluoride laser, carbon-dioxide laser, hydrogen-chloride laser, and an excimer laser.

* * * * *